United States Patent Office 3,374,889
Patented Mar. 26, 1968

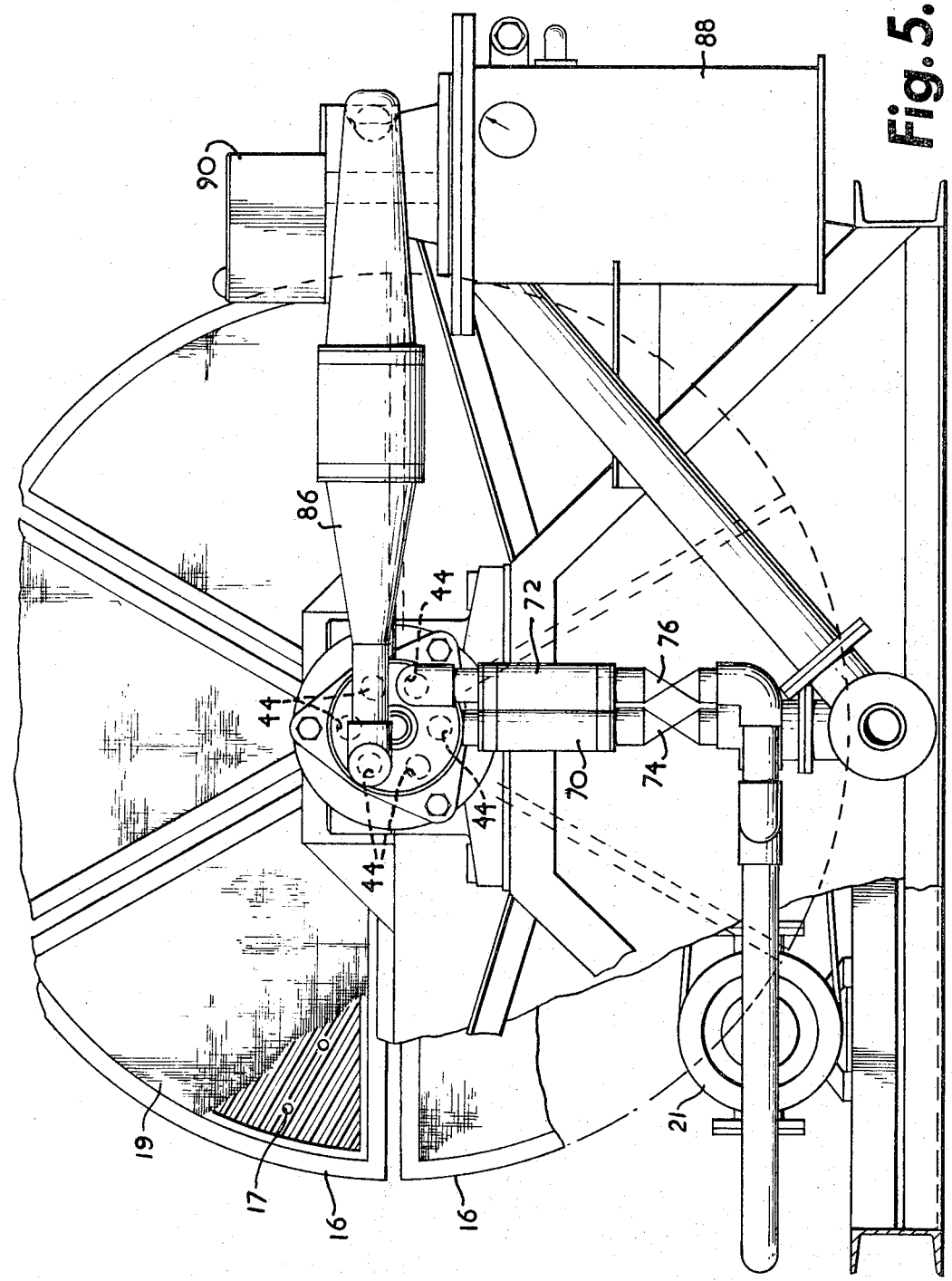

3,374,889
FILTRATION
Walter May Wallace, Carlisle, Cumberland, England, assignor to Simonacco Limited, Carlisle, England, a British company
Filed July 6, 1965, Ser. No. 469,471
Claims priority, application Great Britain,
July 14, 1964, 29,201/64
1 Claim. (Cl. 210—77)

This invention is concerned with improvements in or relating to filtration.

A previously proposed type of filter for solid liquid filtration comprises (a) a tank for material to be filtered, (b) a circular cylindrical member arranged to rotate about its axis, the cylindrical member being partially immersed in the material in the tank in the operation of the filter and comprising a plurality of separate hollow sectors each having apertures leading from a major face of the sector to the hollow interior thereof, filter cloth being laid over said major face in the operation of the filter, (c) means for applying vacuum to the interior of each sector, and (d) means for supplying compressed air to the interior of each sector, the arrangement being such that in the operation of the filter each sector passes through the material vacuum being applied to the interior of said sector while it is in the material, and then passes out of the material, filter cake being blown off the sector by compressed air supplied to the interior of the sector while it is out of the material.

We mean a filter of this type when the expression "a filter of the type referred to" is used hereinafter.

In one example of a filter of the type referred to the cylindrical member is a thin disc.

In a previously proposed method of operation of a filter of the type referred to, each sector is blown off once in each revolution of the cylindrical member. However, often difficulties have arisen in blowing off the filter cake cleanly, particularly but not exclusively with materials having fine solid particles, e.g. fine magnesium hydroxide slurries and froth flotation tailings from coal washing.

It is an object of the invention to provide an improved method of filtering using a filter of the type referred to.

It is another object of the invention to provide a filter of the type referred to adapted for use in carrying out such a method.

The invention provides a method of filtering using a filter of the type referred to wherein filter cake is blown off each sector once only in a plurality of revolutions of the cylindrical member.

We have found that using this method filter cake is cleanly blown off and that by operating the cylindrical member at an increased speed at least the same throughput of filtrate can be achieved as in said previously proposed method.

With a cylindrical member having N sectors each being blown off once in R revolutions, there may be, for example, no blow-off for R−1 successive revolutions and then each sector may be blown off in turn in the next revolution. Alternatively, there may be a uniform interval between blow-offs, for example, for a cylindrical member having N sectors there will be a blow-off once in every R/N revolutions; in this case it is a condition that R and N do not have a common factor. For example, if N is 6, R may be 5 or 7, but not 2, 3 or 4. If N is 12, R may be 5, 7 or 11, but not 2, 3, 4, 6, 8, 9 or 10.

It will be realised that in the method of the invention the filter cake is built up in N layers, one layer in each revolution, each layer before the last one, leaving the material in the tank and having an opportunity to be dried before formation of the next layer.

There now follows a description, to be read with reference to the accompanying drawings, of a disc filter embodying the invention. This description is given by way of example of the invention only and not by way of limitation thereof.

In the drawings:

FIGURE 5 is an end elevation, partly broken away and sectioned, showing details of the disc filter.

Figure 1:
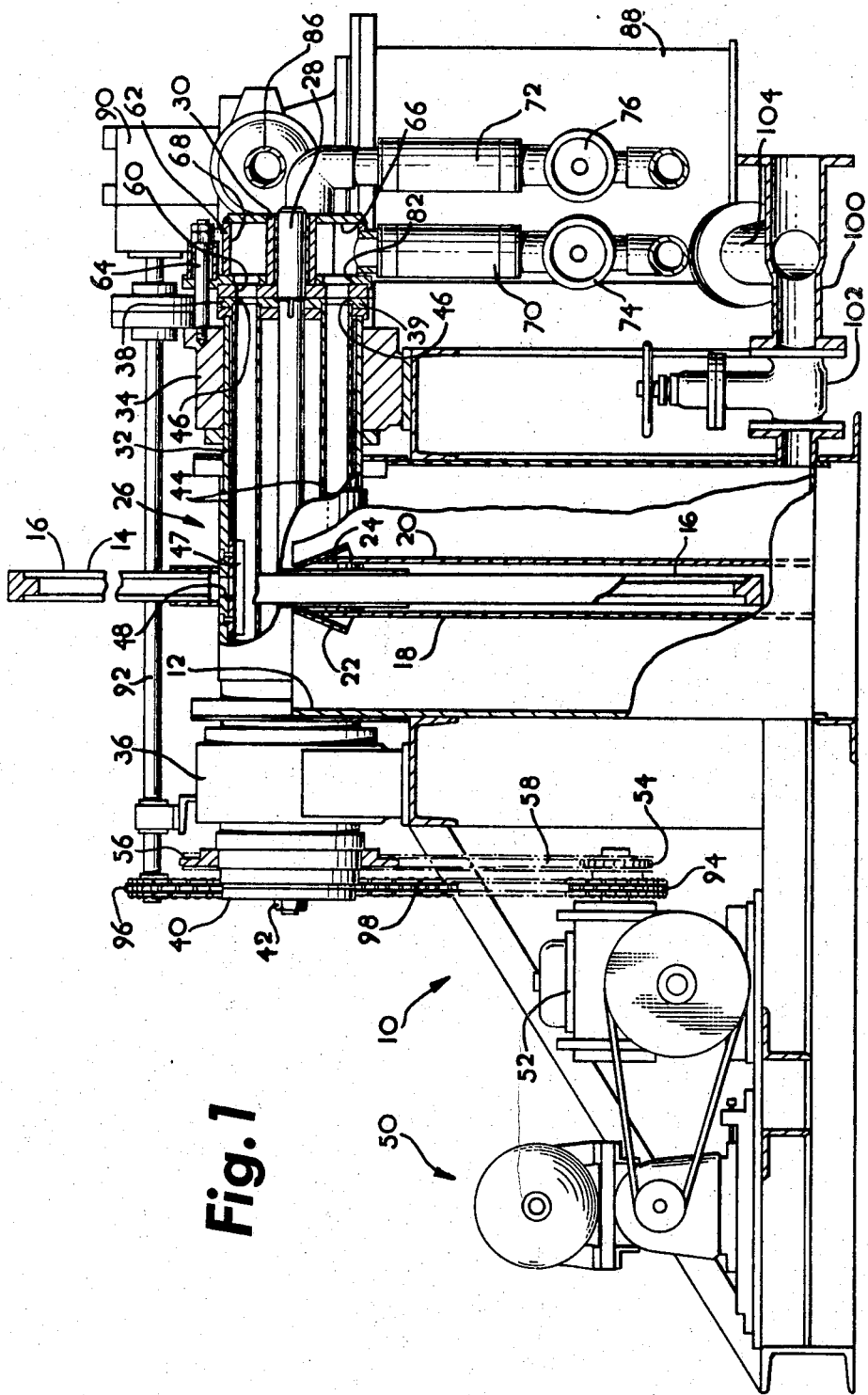
FIGURE 1 shows a view, partly broken away and partly in section of parts of the disc filter.

The disc filter comprises a framework 10, a tank 12, for a slurry to be filtered, mounted in the framework 10, and a thin vertical circular disc 14 arranged to rotate about its axis, the disc 14 being partially immersed in the slurry in the tank 12 in the operation of the filter. A drain pipe 100 leads out of the tank 12 and a valve 102 is provided in the pipe 100 which valve 102 is closed in the operation of the filter. An overflow pipe 104 leads from an upper portion of the tank 12 into the drain pipe 100 downstream of the valve 102. Referring to FIGURE 5, disc 14 comprises six separate hollow sectors 16 each of which corresponds generally to the sectors described in U.K. patent specifications Nos. 870,769 and 894,318 to which reference may be made. As disclosed in those patents and as shown in FIGURE 5, each sector 16 comprises a plurality of apertures 17 leading from each major face thereof to the hollow interior thereof, filter cloth 19 being laid over said major faces. The filter also comprises a vacuum pump 21 adapted to apply vacuum to the interior of each sector 16, and an air compressor (not shown) connected to reservoir 88 is adapted to supply compressed air to the interior of each sector 16.

In the operation of the filter the disc 14 rotates so that in each revolution thereof each sector 16 passes through the slurry, vacuum being applied to the interior of the sector 16 while it is in the slurry; the sector 16 is substantially completely immersed in the slurry when in a lowermost position. Filtrate is drawn through the filter cloth 19 of the sector 16 by the vacuum and filter cake is deposited on the cloth. The sector 16 then passes out of the slurry and vaccum is applied to dry the filtrate. In one revolution out of every seven of the disc 14 compressed air is supplied to the interior of the sector 16 while it is out of the slurry and the filter cake is blown off the cloth on both sides of the disc 14.

The filter comprises two chutes 18, 20, into which the blown filter cake falls, and two deflector plates 22, 24 adapted to guide the filter cake into the chutes 18, 20.

The filter comprises a shaft assembly 26 mounted for rotation in the framework 10 and to which the sectors 16 are secured. The shaft assembly 26 comprises a horizontal shaft 28 (FIGURE 2) mounted for rotation in a bearing 30 supported in the framework 10, and also comprises a drum 32 secured coaxially around the shaft 28 and mounted for rotation in bearings 34, 36 (FIGURES 1 and 2) supported in the framework 10; the sectors 16 are secured around the drum 32. A right hand (FIGURE 2) portion of the shaft 28 is secured in a circular plate assembly 38 (FIGURES 1, 2 and 3) which is itself secured to the drum 32; the plate assembly 38 comprises a bearing plate 39. A left hand end portion of the shaft 28 is threaded and is secured to an end plate 40 of the drum 32 by a nut 42. Six horizontal pipes 44 are mounted in the drum 32 symmetrically about the shaft 28, one pipe 44 being associated with each sector 16. In the operation of the filter the vaccum is applied and the air supplied to the sectors 16 through the pipes 44. The right hand end of each pipe 44 communicates with a corresponding hole 46 extending through the plate assembly 38 and the left hand end of each pipe 44 is closed. Each pipe 44 has a block 47 secured in a wall portion thereof adjacent the sectors 16. The block 47 is screwed to the drum 32 and the pipe 44 communicates with the hollow interior of its sector 16 through a nozzle 48 extending through the drum 32 and the block 47.

The filter comprises an electric motor 50 arranged to rotate the shaft assembly 26 through a gear box 52, sprockets 54, 56 and a chain 58.

Figure 4:
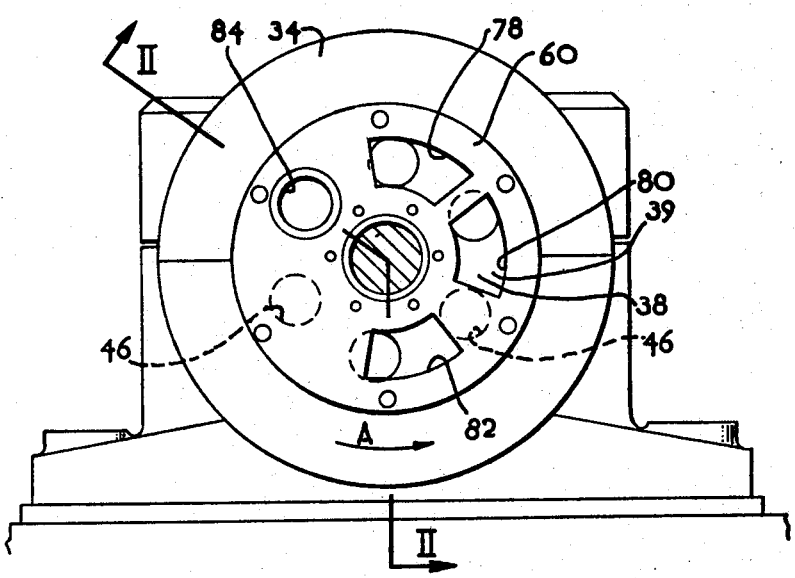
FIGURE 4 is a section on the line IV—IV of FIGURE 2.

The filter comprises a stationary circular plate 60 and in the operation of the filter the bearing plate 39 of the plate assembly 38 rotates in contact with the plate 60. The plate 60 is secured to a housing 62 (FIGURE 1) which is secured to the bearing 34 by studs 64 (only one of which is shown); the pressure between the plate 39 and the plate 60 is adjustable by the studs 64. The housing 62 comprises two vacuum chambers 66, 68 (FIGURES 1 and 2) connected to the vacuum pump by pipes 70, 72, respectively, in which are located pressure regulating valves 74 76 respectively. The plate 60 (FIGURE 4) comprises two generally segmental openings 78, 80 extending therethrough and in communication with the chamber 68 and another generally segmental opening 82 below the openings 78, 80, also extending through the plate 60 and in communication with the chamber 66. The plate 60 also comprises a circular hole 84 connected to a pipe 86 which is connected to a compressed air reservoir 88 through a rotary control valve 90. The control valve 90 is operated by a spindle 92 which rotates with the disc 14, being rotated by the electric motor 50 through the gearbox 52, sprockets 94, 96 and a chain 98.

In the operation of the filter rotation of the shaft assembly 26 in the direction of the arrow A (FIGURES 3 and 4) causes vacuum to be applied to each pipe 44 as it passes the opening 82 to draw off filtrate through the appropriate sector 16 and also as it passes the openings 80, 78 to dry the filter cake. The speed of the spindle 92 is so adjusted that the control valve 90 allows air to pass from the reservoir 88 through the pipe 86 and the hole 84 into each pipe 44 to blow off filter cake every 1⅙ revolutions of the shaft assembly 28. In this way filter cake is blown off each sector 16 once only in every seven revolutions of the disc 14.

Figure 2:
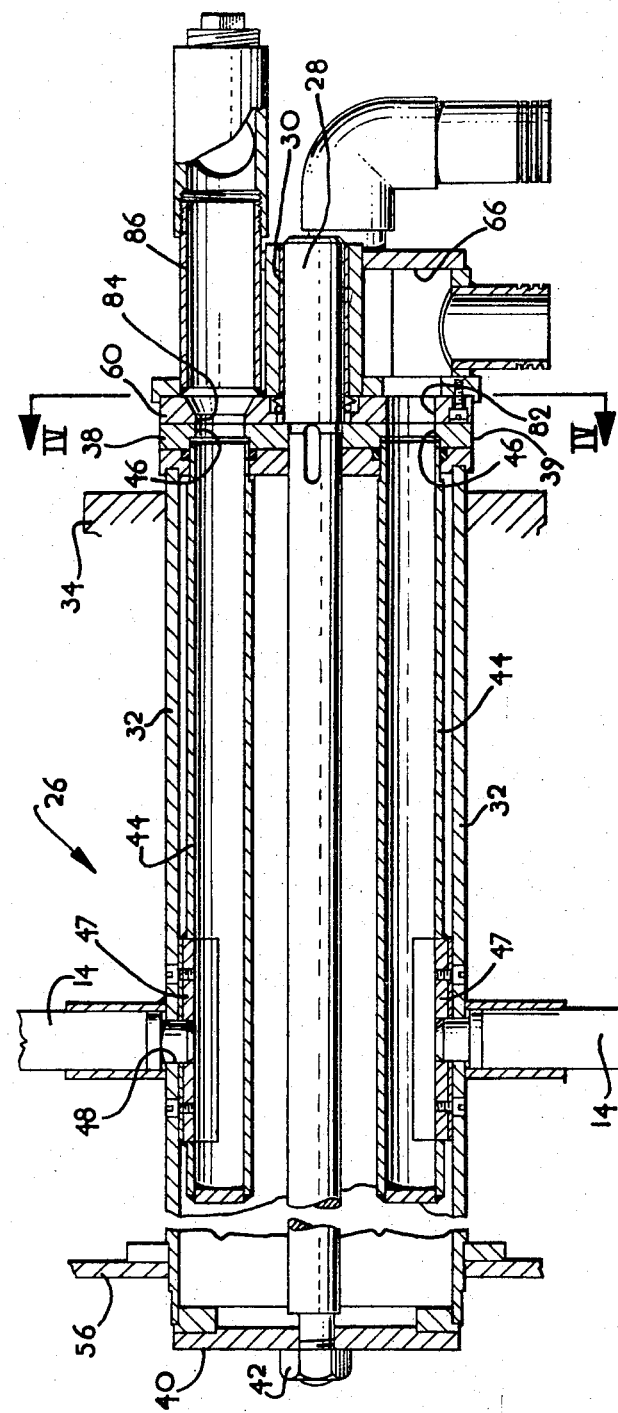
FIGURE 2 shows an enlarged view of parts shown in FIGURE 1, being a section on the line II—II of FIGURE 4.
Figure 3:
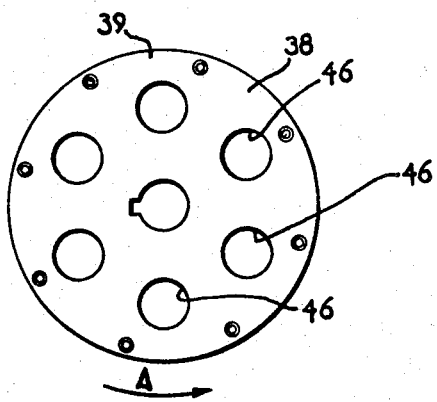
FIGURE 3 is a view of a plate assembly of the filter.

In further explanation of operation of the disclosed invention, it will be appreciated that each of the six pipes 44 rotating with drum 32 is open near its left end in FIGURES 1 and 2 through a nozzle 48 to the interior of a separate one of the six hollow sectors 16 shown in FIGURE 5. The right end of each pipe 44 in FIGURES 1 and 2 terminates in an opening 46 (FIGURES 1, 2 and 3) in plate assembly 38 which rotates with the drum, and these openings 46 pass over the stationary vacuum slots 78 and 80 and the air pressure admission aperture 84 during each rotation of drum 32. Chambers 66 and 68 are always connected to the vacuum pump.

While each pipe 44 is passing over a slot 78 or 80 it will subject the hollow interior of the associated sector 16 to vacuum. If the sector is immersed in the slurry of tank 12, this application of vacuum will cause a layer of filtrate to accumulate on the fabric filter screening 19 at each side of the sector. If the sector is above the slurry when vacuum is applied to its associated pipe 14, this will draw in air and dry the layer of filtrate on the fabric.

Compressed air is applied to opening 84 only periodically, and (see FIGURE 1) only to a pipe 44 at an upper vertical location during rotation so that air pressure will be applied only to a non-immersed filter layer.

The timing of valve 90 is such that a plurality of layers of filtrate are collected and dried on each side of each sector 16, before being blown off. As pointed out above, filtrate is being accumulated in the particular sector 16 that is connected to the particular pipe opening 46 passing vacuum slot 82, and this particular sector 16 will not align its pipe opening 46 with air admission opening 84 at a time when valve 90 is open for a plurality of revolutions of drum 32 and during that time the particular sector will have become immersed in the slurry a plurality of times and subjected to vacuum to accumulate further filtrate on the fabric.

In a modification the valve 90 is so arranged and adjusted that there is no blow-off for six revolutions and then each sector is blown off in turn in the next revolution. This can be done by inserting a suitable conventional operating mechanism for valve 90 driven by shaft 92.

*Example*

The disc filter described with reference to the drawings was used to filter an aqueous slurry of magnesium hydroxide comprising about 30% solids, the particle size being minus 300 mesh.

The filter was rotated at about 0.4 r.p.m. with each sector being blown off once in each revolution of the disc. A blow-off air pressure of 25 lbs./square inch was required and the filter cake did not come away cleanly. The solids content of the filtrate was less than 5%. The filter was then rotated at about 2.8 r.p.m. with blow-off once in every seven revolutions. The required blow-off pressure was not greater than 6 lbs./square inch, the filter cake came away cleanly and increased throughput was achieved without causing any increase in the solids content of the filtrate.

I claim:

1. In a method of filtering a solid/liquid material wherein successive separate hollow filter sections of a rotatable filter assembly are cyclically immersed in said material and then removed from said material, the steps of applying vacuum to the interior of each section while it is immersed in said material to accumulate filter cake on said screening and periodically introducing compressed air into the interior of each said section in timed relation to rotation of the filter assembly to blow off filter cake while said section is removed from said material and only after said removed section has been successively immersed in said material a plurality of times so that a plurality of layers of filter cake are accumulated on each said section before filter cake removal, said compressed air being applied to a filter section once during a period consisting of a complete revolution of the filter assembly plus a rotational increment thereof susbtantially equal to the reciprocal of the number of filter sections.

References Cited

UNITED STATES PATENTS

| | | | |
|---|---|---|---|
| 948,477 | 2/1910 | Diver | 210—395 |
| 2,096,314 | 10/1937 | Banks et al. | 210—395 |
| 2,352,330 | 6/1944 | Lee | 210—395 |
| 3,244,281 | 4/1966 | Kurz et al. | 210—391 X |
| 3,077,989 | 2/1963 | Larkin | 210—108 |

FOREIGN PATENTS

| | | |
|---|---|---|
| 232,099 | 1/1961 | Australia. |
| 660,941 | 4/1963 | Canada. |
| 677,807 | 8/1952 | Great Britain. |
| 883,840 | 12/1961 | Great Britain. |

SAMIH N. ZAHARNA, *Primary Examiner.*

REUBEN FRIEDMAN, *Examiner.*

J. ADEE, *Assistant Examiner.*